April 9, 1929.  I. F. KEPLER  1,708,141
RUBBER LINED TUBE AND METHOD FOR MAKING SAME
Filed Nov. 14, 1924
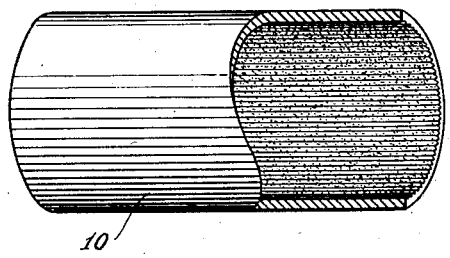
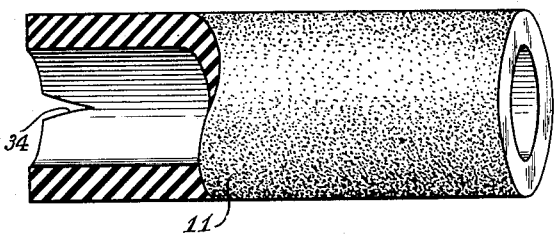
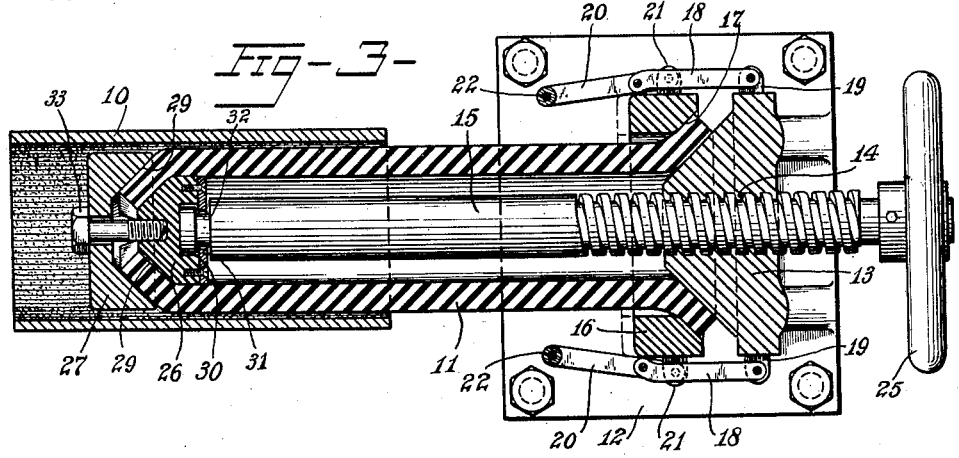
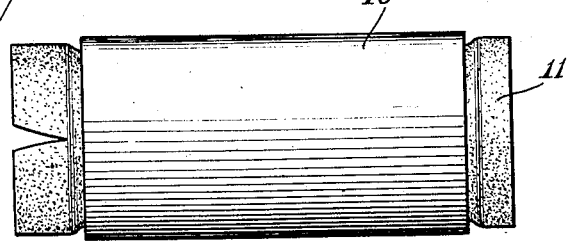
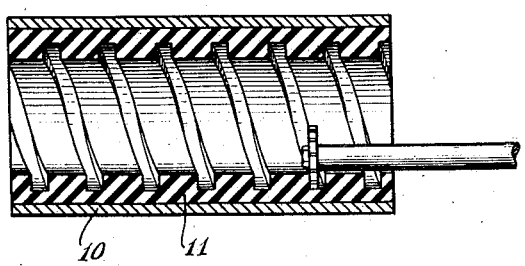
Inventor
Irwin F. Kepler
By Robert M. Pierson
Atty.

Patented Apr. 9, 1929.

1,708,141

UNITED STATES PATENT OFFICE.

IRWIN F. KEPLER, OF AKRON, OHIO, ASSIGNOR TO THE B. F. GOODRICH COMPANY, OF NEW YORK, N. Y., A CORPORATION OF NEW YORK.

RUBBER-LINED TUBE AND METHOD FOR MAKING SAME.

Application filed November 14, 1924. Serial No. 749,864.

This invention relates to rubber lined tubes and to means for applying rubber linings to tubes of rigid material, particularly metal tubes.

A primary object of this invention is to provide an improved rubber lined tube in which the rubber lining will be firmly held in position within the tube by reason of a radial pressure exerted on the tube by the rubber lining. A further object is to provide an improved method for inserting a rubber lining into a tube which will cause the lining when in place to be in a condition of circumferential compression, and hence to press outwardly against the inner surface of the tube. A still further object is to provide an apparatus for carrying out the above indicated processess.

In the accompanying drawings, Fig. 1 is a view partially in elevation and partially in section of a metal tube or cylindrical shell to be lined; Fig. 2 is a similar view of an annular rubber lining for the tube; Fig. 3 is a sectional view of an apparatus adapted to carry out the process of my invention, the rubber lining being shown with its diameter diminished by reason of its elongated condition and being partially inserted into the tube; Fig. 4 is a view in elevation of the rubber lined tube after its removal from the apparatus of Fig. 3; and Fig. 5 is a sectional view of a rubber lined tube provided with a helical lubricant groove in the inner surface of the lining and illustrative of a use of rubber lined tubes for shaft bearings.

Referring more particularly to the drawings, I show a tube 10 of metal, or other rigid material, having a finely serrately-grooved inner surface. The term tube is herein employed in a generic sense to include a cylindrical shell or drum of any character. As shown, the grooves run longitudinally of the tube, but they may, if desired, run circumferentially of the tube, or the inner surface of the tube may be otherwise roughened, or may be smooth. The annular lining 11 for the tube may be of any elastic, compressible material and is preferably of a wear-resisting soft-vulcanized rubber. The external diameter of the annular lining 11 is materially larger than the internal diameter of the tube 10, in order that it may of its own elasticity be firmly held in the tube 10 when inserted therein.

By reason of the oversize of the lining 11 for the tube 10, it is necessary to diminish its sectional dimension before it can be inserted into the tube 10. This may be done in any suitable manner. The apparatus of Fig. 3 is illustrative of a machine that may be employed for this purpose, but it is to be understood that my invention is not wholly limited to the employment of the specific machine shown. The apparatus illustrated consists of a base plate 12 having a frusto-conical member 13 spaced therefrom and preferably integrally connected therewith. The frusto-conical member 13 has its axis extending parallel to the face of the base plate and is provided with an axial, coarse-threaded aperture 14, in which a threaded rod 15 engages.

An annular clamp 16, axially aligned with the member 13 and having a beveled edge 17 opposing the conical surface of the member 13, cooperates with the conical surface to grip an end of the annular lining 11. As shown, the clamp 16 is supported by two oppositely-disposed toggle connections, each consisting of a lever 18 pivotally secured at one end to the member 13, as by a lug 19, and a lever 20 pivotally secured to a lug 21 on the clamp 16, the other end of the lever 18 being pivotally connected to the lever 20 at a point intermediate its ends. A handle 22 is disposed at the free end of each of the levers 20. The arrangement is such that when the handles 22 of the levers 20 are thrown inwardly, as shown in Fig. 3, the clamp 16 grips the end of the annular lining against the frusto-conical member 13. Upon throwing the handles 22 outwardly, the clamp 16 moves from the member 13 and releases the end of the annular lining.

The rod 15 is provided at the end adjacent to the frusto-conical member 13 with a hand wheel 25 and at its opposite end with a grip for holding the other end of the annular lining 11. The grip may be of any suitable construction, an essential, however, being that it shall be of such size as readily to enter the tube 10. As shown, the grip consists of an inner member 26 and an outer member 27 having parallelly-disposed, beveled surfaces 28 and 29, respectively, which coact to hold the material of the annular lining. The inner member 26 has a shallow bore 30 in which the end of the rod 15 engages and is rotatably locked thereto by means of a face plate 31 engaging in an annular groove 32 in the rod 15. A set screw 33 serves to bring the inner and outer members into gripping contact with the end of the annular lining.

In utilizing the apparatus above described for lining a metallic tube or cylindrical shell with an annular, vulcanized rubber lining, I preferably cut two or more V-shaped slits 34 in one end of the annular lining 11 and coat the outer surface thereof with a cement which adheres firmly to the rubber of the lining. The inner surface of the tube 10 is similarly coated with a cement which adheres firmly to the metal of the tube. The cements employed may be of any suitable compositions, preferably curable rubber cements which vulcanize quickly at a relatively low temperature. When the cements have dried, the cemented surfaces are dusted with a so-called disappearing powder, that is, one which is readily absorbed in the cements upon heating. I find that zinc stearate is particularly adapted for this purpose because of its low fusing point, approximately 69° C., and because of the readiness with which it is taken up by the rubber of the cements upon heating. A powder of this character facilitates the insertion of the lining into the tube by preventing sticking of the tacky cemented surfaces without affecting detrimentally the adhesive power of the cements after the latter have absorbed the powder.

The annular lining thus prepared is ready to be diminished in its sectional dimension to enable it to be inserted into the tube 10. In the specific embodiment herein described, it is placed in the apparatus of Fig. 3 by clamping the slit end of the annular lining 11 between the grip members 26 and 27, and the other end between the frusto-conical member 13 and clamp 16, and is then stretched in an axial direction by rotating the threaded rod 15 sufficiently to reduce its outside diameter to a somewhat smaller dimension than that of the inner diameter of the tube 10. The tube 10 is now slipped over the stretched lining, after which the stretching tension is removed, allowing the lining to expand radially into a close engagement with the inner surface of the tube. Since the lining in place in the tube has a diameter lesser than its original diameter, the material of the lining is held under a circumferential compression which forces the outer surface of the lining into a pressure contact with the tube.

The lined tube is given a brief cure, as by placing it in a dry-heat oven, for the purpose of vulcanizing the cement and absorbing the dusting powder. The time and temperature of heating should be such as not to soften the rubber of the lining to an extent that the compressive stresses in the rubber are released. Where zinc stearate is employed as a dusting powder, I find that a heating of four or five minutes in an oven at a temperature corresponding to 75 pounds steam pressure is sufficient to cure the cements, to fuse the zinc stearate and to cause its absorption in the cement, without destroying the compressive stresses in the rubber of the lining.

When the lined tube is to be employed for a shaft bearing, the excess lining material is trimmed from the ends, the interior ground to size and a lubricant groove milled or ground into its inner surface portion, as shown in Fig. 5. In making shaft bearings of this character, an annular lining several feet long may be subjected to a stretching action and a plurality of cylindrical shells slipped over the stretched lining. Alternatively, a single tube somewhat shorter than the original lining, to allow for the end portions of the lining held in the clamps, may be slipped over the stretched lining, the stretching tension released, and the lined tube subsequently cut up into sections of required length.

For some purposes I find that it is not necessary to join the rubber lining to the tube by cement, particularly where the inner surface of the tube is serrately grooved or otherwise provided with ridges or protrusions, since the rubber of the lining upon expanding, when the stretching tension is released, is forced into the grooves and interlocks with the ridged inner surface of the tube.

A tube lined with an elastic compressible material in accordance with the present invention has the advantage of a very firm adhesion of the lining to its inner surface. Further, the process herein recited is practical and economical, and lends itself to factory production methods.

I have shown but one form of apparatus for carrying out my method and have referred specifically to but one way of diminishing the sectional dimension of the annular lining for its insertion into the tube. It is obvious that numerous variations and modifications in the construction of the apparatus may be made and that other means for diminishing the sectional dimensions of the annular lining may be employed without departing from the principles of this invention. I therefore do not purpose to limit the claims of this application otherwise than necessitated by the prior art.

I claim:

1. The method of lining a tube which comprises subjecting an annular, elastic, compressible lining of materially greater external diameter than the internal diameter of the tube to a force diminishing its sectional dimension, disposing the lining while under diminished section within the tube, and then releasing the dimension diminishing force, whereby the lining by reason of its elasticity will tend to assume its original dimensions and forcefully press against the inner surface of the tube.

2. The method of lining a tube which comprises subjecting an annular, elastic, compressible lining of materially greater external perimeter than the internal perimeter of the tube to a force diminishing its external perimeter to less than that of the internal perimeter of the tube, disposing the lining while under diminished external perimeter within the tube, and releasing the perimeter diminishing force, whereby the lining by reason of its elasticity will tend to assume its original dimensions and forcefully press against the inner surface of the tube.

3. The method of lining a tube which comprises preparing an annular, elastic, compressible lining of materially greater external diameter than the internal diameter of the tube by coating the outer surface of said annular lining with a cement, subjecting the annular lining to a force diminishing its sectional dimension, disposing the lining while under diminished section within the tube, and releasing the dimension diminishing force, whereby the lining by reason of its elasticity will tend to assume its original dimension and forcefully press against the inner surface of the tube.

4. The method of lining a tube with an annular, elastic, compressible lining of materially greater external diameter than the internal diameter of the tube which comprises coating the outer surface of the annular lining and the inner surface of the tube with cement, dusting the cemented surfaces when dry with a fine, dry, fusible powder, subjecting the annular lining to a force diminishing its sectional dimension, disposing the lining while under diminished section within the tube, releasing the dimension diminishing force, and then heating the lined tube to such temperature as to fuse the dusting powder.

5. The method of lining a tube with an annular, elastic, compressible lining of equal or greater external diameter than the internal diameter of the tube which comprises coating the outer surface of said annular lining and the inner surface of the tube with quick-curing rubber cement, dusting the cemented surfaces when dry with a fine, dry, fusible powder, subjecting the annular lining to a force diminishing its sectional dimension, disposing the lining while under diminished section within the tube, releasing the dimension diminishing force, and then heating the lined tube to such temperature as to fuse the powder and to cure the cement.

6. The method of lining a tube with an annular, elastic, compressible lining of materially greater external diameter than the internal diameter of the tube which comprises elongating the annular lining sufficiently to make its external diameter less than the internal diameter of the tube, placing the tube telescopially over the lining, and releasing the elongating force.

7. An article of manufactur comprising a tube of rigid material having a roughened interior surface and a circumferentially-compressed, annular, vulcanized-rubber lining therefor held in pressure contact with the interior surface of the tube by reason of radially-acting, elastic forces within the compressed material of the lining.

8. An article of manufacture comprising an outer tube of rigid material having a serrately-grooved, interior surface and a circumferentially-compressed, annular, elastic lining therefor held in close engagement with the interior of the tube by reason of radially-acting, elastic forces within the compressed material of the lining.

9. An article of manufacture comprising a tube of relatively rigid material, and a tubular lining of soft vulcanized rubber confined therein in a condition of longitudinal stretch and radial contraction causing the lining to press outwardly against the tube.

10. An article of manufacture comprising a metal tube, a tubular lining of soft vulcanized rubber confined therein in a longitudinally stretched and radially contracted condition, and a layer of cement connecting said tube and lining and held under pressure by the lining.

In witness whereof I have hereunto set my hand this 6th day of November, 1924.

IRWIN F. KEPLER.